Figure 1:
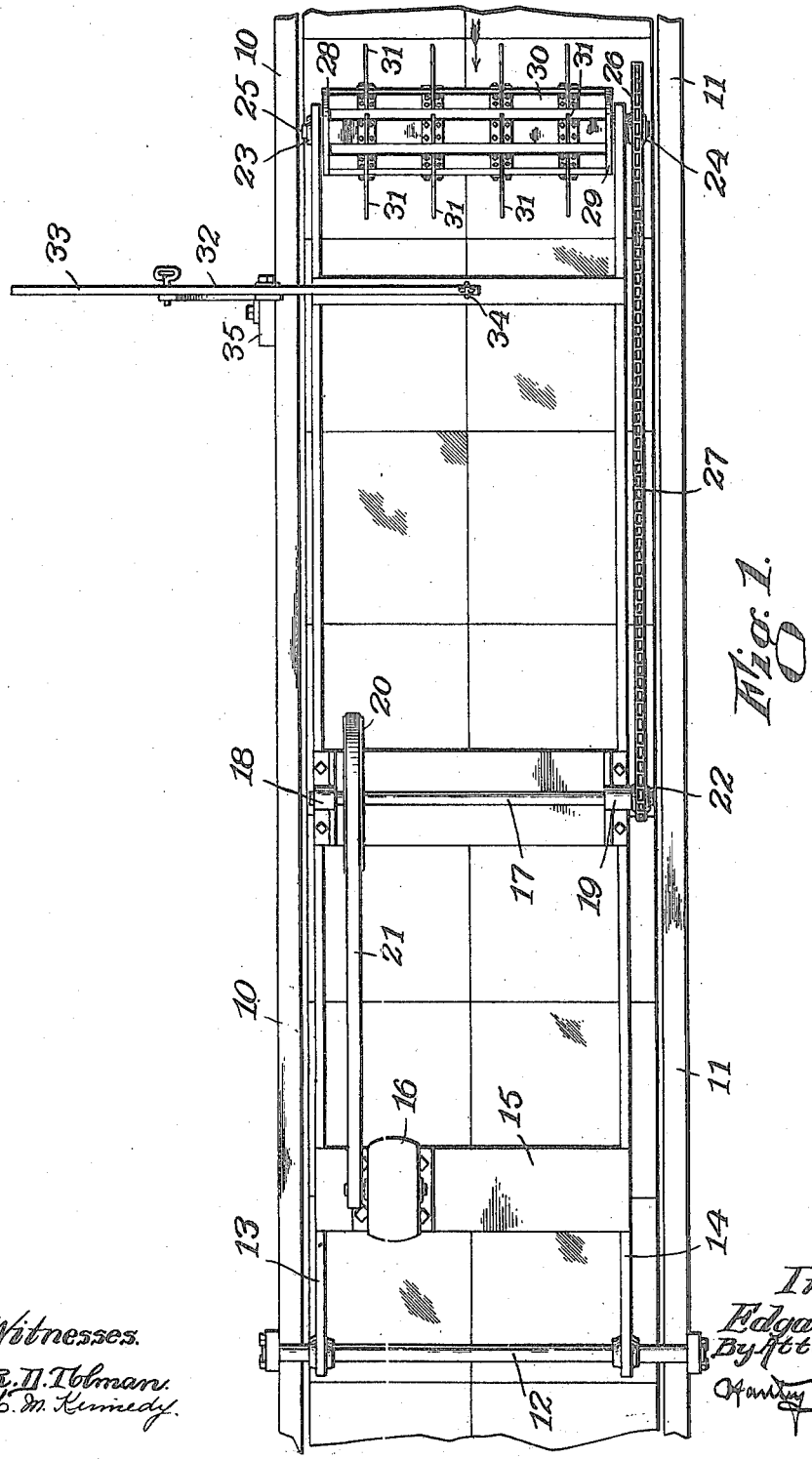

E. M. BOND.
ICE HARVESTING MACHINERY.
APPLICATION FILED APR. 13, 1914.

1,268,088.

Patented June 4, 1918.
2 SHEETS—SHEET 1.

Witnesses.
R. H. Tolman.
H. M. Kennedy.

Inventor
Edgar M. Bond,
By Attorney.

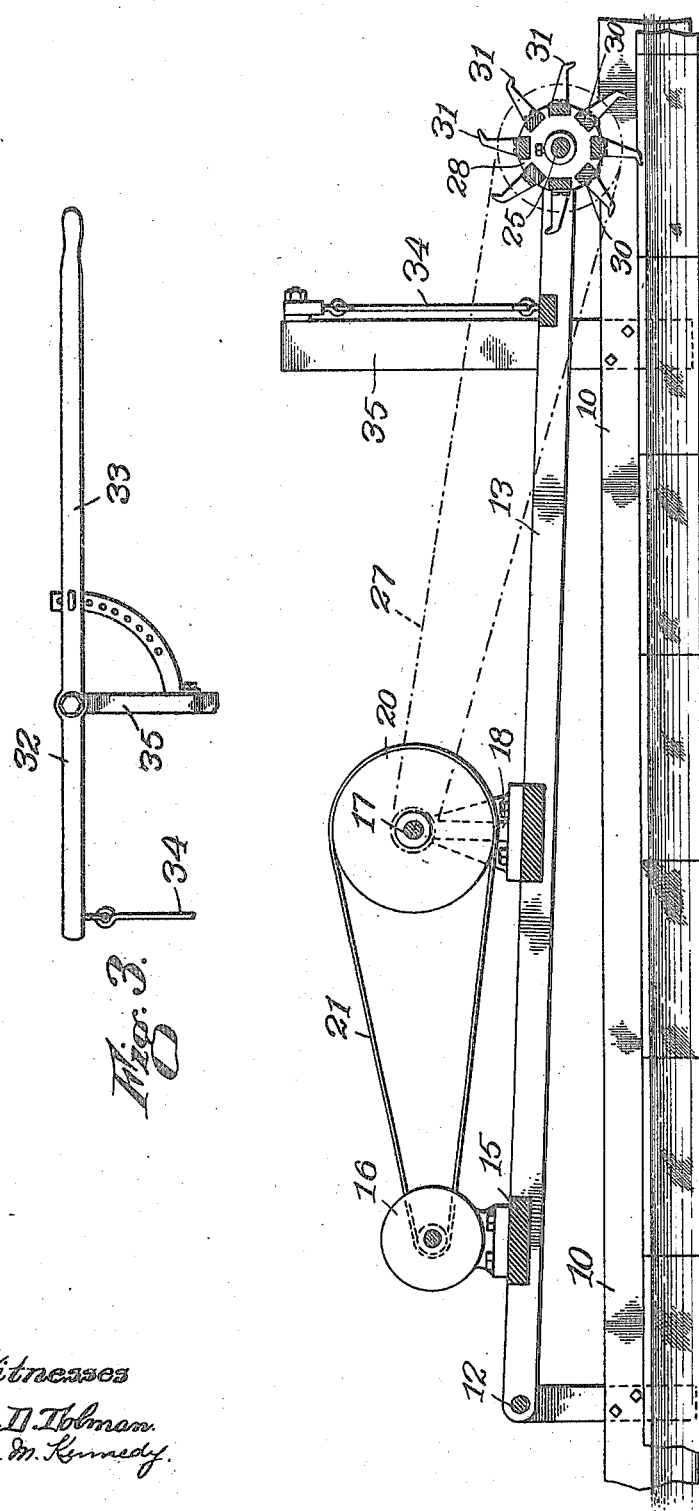

UNITED STATES PATENT OFFICE.

EDGAR M. BOND, OF WORCESTER, MASSACHUSETTS.

ICE-HARVESTING MACHINERY.

1,268,088.  Specification of Letters Patent.  Patented June 4, 1918.

Application filed April 13, 1914. Serial No. 831,479.

*To all whom it may concern:*

Be it known that I, EDGAR M. BOND, a citizen of the United States, residing at Worcester, in the county of Worcester, State of Massachusetts, have invented a certain new and useful Improvement in Ice-Harvesting Machinery, of which the following is a specification, reference being had therein to the accompanying drawings.

This invention relates to ice harvesting and handling machinery, but more particularly to machinery for forcing ice in a runway such as the channel which conducts the ice cakes from the pond to the bottom of the incline leading to the ice house, and has for its object to provide means for performing mechanically what has heretofore been done manually.

It is generally customary to propel the ice cakes through a run-way or channel by arranging gangs of men on opposite sides thereof provided with spurred pushing poles. As these cakes float very deep when in the water, considerable effort is necessary to so propel them and therefore the men have to be located very close together.

With the present invention, the cakes are propelled mechanically through the channel or on the run-way and only sufficient men to watch for possible jamming of the cakes are necessary, thus producing a great saving in labor and a corresponding reduction in the cost of harvesting or handling the ice.

The size of the machine would necessarily vary according to the size of the channel or run-way in which it was to be used.

The many other features and advantages of the invention will be fully described hereinafter and included in the claims.

One embodiment of the invention is shown in the drawings in which:—

Figure 1 is a plan view of the invention complete.

Fig. 2, transverse longitudinal section of the invention.

Fig. 3, detail view of the controlling means, as will be fully described hereinafter.

Referring to the drawings the invention is shown in connection with a run-way here composed of side pieces 10 and 11 which act as guides for the cakes which enter in the direction indicated by the arrow in Fig. 1. Preferably mounted on these side pieces or guides 10 and 11 is a shaft 12 extending over the channel, and pivotally mounted on this shaft 12 are oppositely disposed side frames 13 and 14 which extend longitudinally of the channel substantially parallel to the side pieces or guides 10 and 11. Having its ends secured to the oppositely disposed side frames 13 and 14 and extending substantially transversely of the channel, is a bridge 12 on which is mounted an electric motor 16. At an interval therefrom and also extending transversely of the channel is a second shaft 17 revolubly mounted in bearings 18 and 19 and upon this shaft is fixed a pulley 20 adapted to be driven by the belt 21 from the motor 16. Secured upon this shaft 17 preferably at or near one of its extremities is a sprocket 22.

Mounted in bearings 23 and 24 at or near the rearward extremities of the side frames 13 and 14 respectively is a shaft 25, upon the end corresponding to the end of the shaft 17 on which is mounted the sprocket 22 is a similar sprocket 26 which is adapted to be driven by means of the chain 27 from the sprocket 22. To this shaft 25 are secured oppositely disposed disks or wheels 28 and 29 between which is a substantially cylindrical member 30 coaxial with the shaft 25. In the present embodiment this member is composed of eight separated cross pieces 30$^a$, but it should be clearly understood that any other suitable form of member could be used. On each of these cross pieces composing the cylindrical member 30 are here placed four spurs 31 preferably spaced apart in the manner best shown in Fig. 1 and here so arranged that two spurs on each cross piece shall engage the same cake of ice at the same time.

These spurs are adapted to be forced into the top face of the cake by the weight of the side frames 13 and 14 and the parts supported thereby and these frames swing upon the shaft 12 so that the member 30 with its spurs will always remain in engagement with the ice passing beneath the same in the channel.

In order to prevent these side frames 13 and 14 and the members supported thereby from swinging downwardly too far when no cakes of ice are passing beneath the member 30 and thus supporting the rear end thereof, a raising and lowering lever attachment 32, best shown in Fig. 3, or other suitable means, is preferably provided. Upon this lever is a control handle 33, and the attachment is connected by a link 34 to the swinging frame. The lever attachment is here fulcrumed on an upright 35 secured to the side piece 10 of the channel. If the cakes should become jammed, the operator can quickly raise the frames and thus correspondingly raise the member 30 so that the spurs will not become jammed. In the present embodiment the motor was connected with the shaft 17 by the belt 21, whereas the shaft 17 is connected with the shaft 25 by a chain. The reason for this is that the belt connection 21 will permit of considerable slipping in case the member 30 should become jammed or the ice travel in the channel or run-way blocked and thus the motor would not be blown out by sudden stopping, while a chain is used to drive the shaft 25 on account of its proximity to the water and liability to become ice coated.

While it has been found to be advantageous to use an electric motor to drive the member 30, any other suitable source of power supply can be used and the power may be conveyed to the shaft 25 by any suitable form of transmission.

The present embodiment has been shown in use in connection with floating ice, but the device is equally applicable for use in a run-way in which the ice cakes are out of the water. The cakes may be fed to the member 30 manually or by any other suitable means.

The applicant is aware that numerous changes in the arrangement and construction of parts may be made by any one skilled in the art without departing from the scope of his invention, and he does not care to be limited to the particular embodiment herein shown and described.

What I claim as my invention and desire to secure by Letters Patent is:—

1. In a device of the class described, means for conducting floating ice in a predetermined path, and a plurality of spaced hook shaped members arranged above said path adapted to successively have their outer extremities forced into the top face of the ice as such ice is fed thereto and to cause said ice to be propelled along said path by the advance of such members.

2. In a device of the class described, means for conducting floating ice in a predetermined path, a plurality of pointed end hook shaped picker members spaced apart and arranged adjacent to said path adapted to successively engage the top surface of the ice to propel it along said path as such members advance, and means for operating said picker members.

In testimony whereof I affix my signature in the presence of two witnesses.

EDGAR M. BOND.

Witnesses:
    HARTLEY W. BARTLETT,
    HANNAH M. KENNEDY.

Copies of this patent may be obtained for five cents each, by addressing the "Commissioner of Patents, Washington, D. C."